United States Patent [19]

Cabanos

[11] Patent Number: 4,850,571

[45] Date of Patent: Jul. 25, 1989

[54] CONNECTOR ASSEMBLY

[75] Inventor: Phil A. Cabanos, Santa Clara, Calif.

[73] Assignee: United States of America, Washington, D.C.

[21] Appl. No.: 179,923

[22] Filed: Apr. 11, 1988

[51] Int. Cl.[4] .......................... B66D 3/08; F16D 1/12

[52] U.S. Cl. .................................... 254/392; 254/399; 403/13

[58] Field of Search ............... 254/335, 336, 337, 392, 254/393, 394, 398, 399, 277, 900, 386; 403/13, 14; 92/62, 129, 261; 414/626; 187/67

[56] References Cited

U.S. PATENT DOCUMENTS

| | | | |
|---|---|---|---|
| 3,871,527 | 3/1975 | Schimmeyer et al. | 92/129 X |
| 3,897,045 | 7/1975 | Butler | 254/392 |
| 4,215,851 | 8/1980 | Holmen | 254/277 |
| 4,236,695 | 12/1980 | Morrison | 254/277 |
| 4,266,468 | 5/1981 | Biggs | 92/129 X |
| 4,349,179 | 9/1982 | Barber | 254/900 X |
| 4,638,978 | 1/1987 | Jordan | 254/392 X |
| 4,759,256 | 7/1988 | Kovit et al. | 254/392 X |

FOREIGN PATENT DOCUMENTS

| | | | |
|---|---|---|---|
| 2485500 | 12/1981 | France | 254/399 |
| 346 | 1/1979 | Japan | 254/392 |
| 161055 | 10/1957 | Sweden | 254/399 |
| 647224 | 2/1979 | U.S.S.R. | 254/392 |

*Primary Examiner*—Joseph J. Hail, III

*Attorney, Agent, or Firm*—Robert M. Wohlfarth; John P. Tarlano

[57] ABSTRACT

The present invention relates to a connector assembly for maintaining a crown block with respect to a fall block of a hoist assembly. A tube on each side of the crown block can retain a rod on each side of the fall block. A hydraulic unit on the free end of the tube has a ram that pushes the rod partially out of the tube, when the crown block and fall block are being held together by a hoist cable.

2 Claims, 2 Drawing Sheets

CONNECTOR ASSEMBLY

A connector assembly for maintaining a fall block of a hoist with respect to a crown block of the hoist.

DESCRIPTION OF RELATED ART

In the past a fall block was held by a cable or rope that passes over a crown block, the crown block being rigidly attached within a hoist assembly. If the hoist assembly happens to be rotated out of a vertical orientation, the fall block will be pulled by gravity out of alignment with the crown block.

The present invention will prevent a fall block from being pulled out of alignment with respect to the crown block, if the crown block hoist assembly is rotated out of a vertical orientation.

SUMMARY OF THE INVENTION

The present invention relates to a connector assembly for maintaining a fall block in alignment with a crown block of the hoist assembly, if the hoist assembly is rotated out of a vertical orientation. The connector assembly will also push the fall block away from the crown block while the fall block is being retained by the crown block.

A tube on each side of the crown block retains a rod on each side of the fall block so that the two blocks remain in alignment even though the crown block is rotated away from a vertical orientation. A hydraulic device, having a ram therein, is mounted to the back end of the tube, with the ram passing into the tube. The ram pushes against the end of the rod, to push the fall block somewhat away from the crown block. The connector assembly will move the fall block away from the crown block even though the fall block and crown block are being pulled together by a hoist cable.

DESCRIPTION OF THE PREFERRED EMBODIMENT

Figure 1:
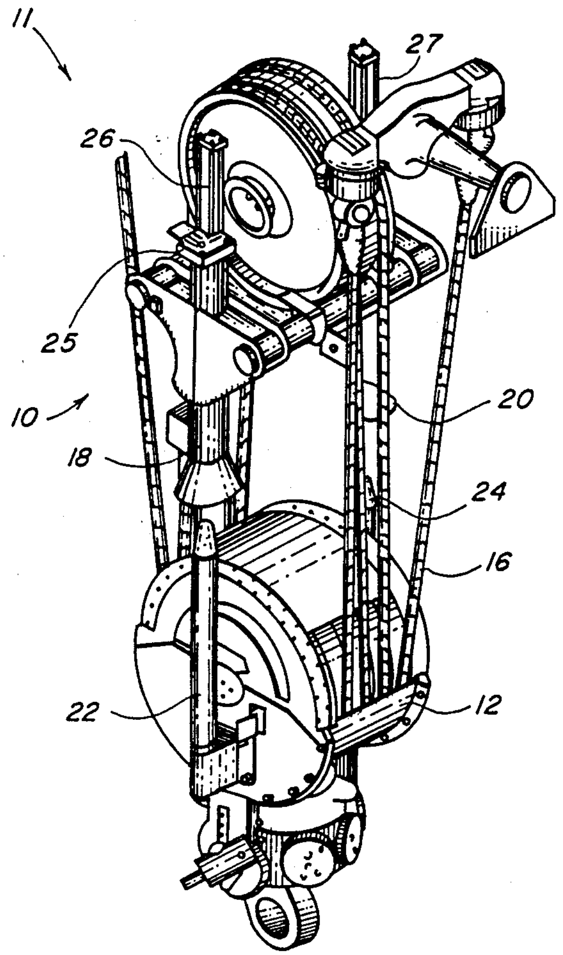
FIG. 1 is a perspective view of the connector assembly in an open position.
Figure 2:
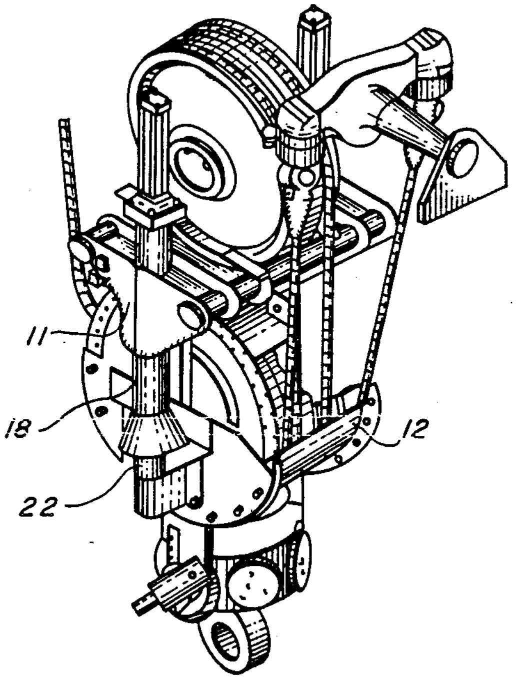
FIG. 2 is a perspective view of the connector assembly in a closed position.
Figure 3:
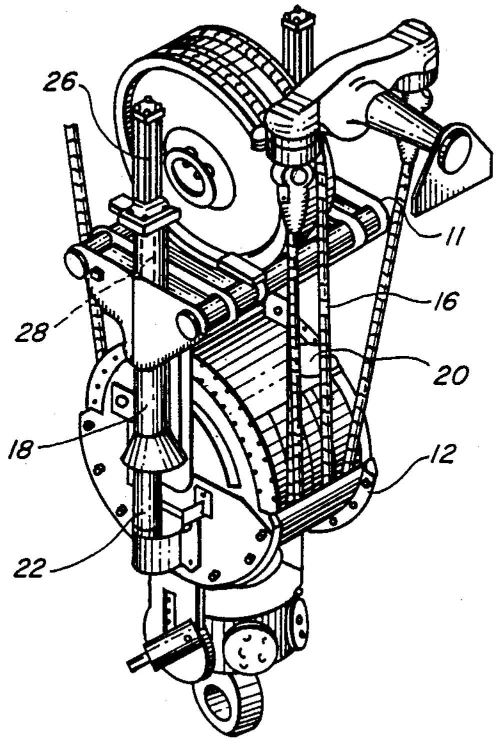
FIG. 3 is a perspective view of the connector in a closed position, with the fall block being pushed away from the crown block.

The preferred embodiment of the present invention is illustrated by way of example in FIGS. 1–3. In FIG. 1, a connector assembly 10, including a crown block 11 and fall block 12 is shown. The crown block 11 is rigidly attached into a hoist assembly. The hoist assembly has other components, such as a hoist drum, not shown. The crown block 11 and fall block 12 are pulled together by means of a hoist cable 16.

Attached to the sides of the crown block 11 are tube 18 and tube 20. The tube 18 is of a sufficient diameter to accommodate and retain a rod 22. A rod 22 and a rod 24 are attached on the sides of the fall block 12. Attached to the free end 25 of the tube 18 is a hydraulic ram unit 26. A similar unit 27 is attached to tube 20.

A ram is movable within the hydraulic ram unit 26. The hydraulic ram unit 26 is activated by pressurized hydraulic fluid to produce such movement. The fluid causes the ram to move. There is also a ram in hydraulic ram unit 27.

FIG. 2 shows tube 18 retaining rod 22. This arrangement prevents the fall block 12 from rotating with respect to the crown block 11, should the crown block 11 be moved out of a vertical orientation. Further, if the crown block 11, to which fall block 12 is attached is moved from a vertical to a horizontal position, the fall block 12 will follow.

FIG. 3 shows the hydraulic unit 26 in an activated condition. The ram 28 pushes the rod 22 of the fall block 12 partially out of the tube 18 of the crown block 11. This occurs even though crown block 11 and fall block 12 are being pulled together by the hoist cable 16. The rod 22 is still being retained by the tube 18. A similiar action occurs with respect to tube 20 and its associated rod.

While the present invention has been disclosed in connection with the preferred embodiment thereof, it should be understood that there may be other embodiments which fall within the spirit and scope of the invention as defined by the following claims.

What is claimed is:

1. A connector assembly, comprising:

(a) a crown block;

(b) a fall block;

(c) a first means attached to the crown block for acting as a retaining part of the connector assembly having an open end toward the fall block;

(d) a freeable second means attached to the fall block for acting as a retainable part of the connector assembly and having an end portion passing into and completely out of the open end of the first means in normal operation of connector assembly; and (e) a hydraulically activated third means attached to the first means for adjustably pushing the second means partially out of the first means in order to adjustably change spacing between the fall block and the crown block, when the second means is within the first means.

2. A connector assembly, comprising:

(a) a crown block;

(b) a fall block;

(c) cable means for holding the crown block and fall block together;

(d) a rigid tube longitudinally mounted on each side of the crown block and having an open end toward the fall block and having a selected diameter;

(e) a hydraulic unit having a hydraulic ram therein, mounted on an end of each tube that is away from the fall block, with the ram movable within the tube; and (f) a freeable rod having an end portion with a diameter smaller than said selected diameter of the tube and being rigidly connected longitudinally on each side of the fall block and substantially in line with said respective tube, each rod passing into and completely out of the open end of its respective tube, pressing against said ram and moving away from said ram in normal operation of the connector assembly.

* * * * *